Aug. 22, 1933.   T. C. DELAVAL-CROW   1,923,777
BEARING MOUNTING
Filed May 5, 1927

INVENTOR_
THOMAS C. DELAVAL-CROW,
his ATTORNEY

Patented Aug. 22, 1933

1,923,777

UNITED STATES PATENT OFFICE 1,923,777

BEARING MOUNTING

Thomas C. Delaval-Crow, Bristol, Conn., assignor to The New Departure Manufacturing Company, Bristol, Conn., a Corporation of Connecticut Application May 5, 1927. Serial No. 188,963

14 Claims. (Cl. 308—189)

This invention relates to bearing mountings and comprises all the features of novelty herein disclosed by way of example in connection with a bearing mounting for the rotary spindle of a grinding wheel.

An object of the invention is to provide an improved spindle mounting for rotary tools such as grinding wheels, more especially a mounting which will compensate for expansion of the spindle due to heat and thereby avoid overloading and heating of the bearings. Another object is to provide an improved mounting which will insure rotation of the spindle on an unvarying axis in spite of belt pull or pressure of the wheel against the work. Another object is to provide such an improved mounting that chatter, play and vibration will be reduced to a minimum. Another object is to provide a simple, easily assembled and inexpensive bearing mounting to meet the special requirements of a rotary tool spindle.

To these ends and also to improve generally upon devices of the character indicated, the invention consists in the various matters hereinafter described and claimed.

Figure 1:
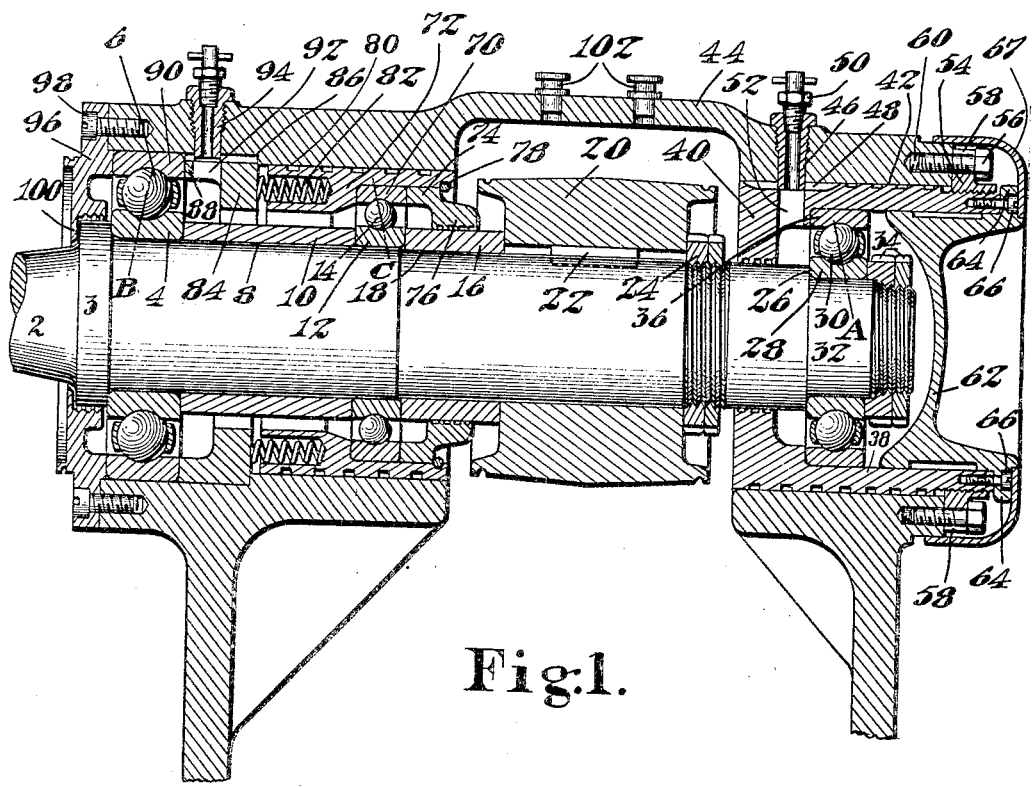

The invention is not necessarily limited to the precise details selected for illustrative purposes in the accompanying drawing in which Figure 1 is a vertical longitudinal section of a grinding wheel spindle and its mounting.

Figure 2:
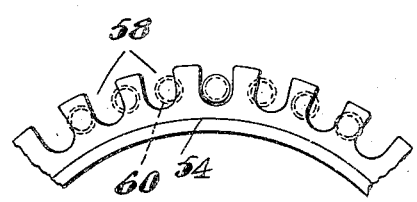

Figure 2 is an end view of a portion of an adjusting means.

The numeral 2 indicates a shaft or spindle to carry any rotary machine tool, such as a grinding wheel. The spindle has a collar or flange 3 forming a shoulder against which abuts an inner race ring 4 of a ball bearing 6, the race ring being pressed on a cylindrical portion 8 of the spindle. A spacing sleeve 10 and an inner race ring 12 of a ball bearing 14 are likewise sleeved on the cylindrical portion 8 of the spindle while a second spacing sleeve 16 is sleeved on a cylindrical portion 18 of the spindle to space the inner race ring 12 from a spindle driving means herein shown as a pulley 20 secured by a key 22 to the spindle. Nuts 24 threaded on the spindle hold the pulley, spacing sleeves and race rings in firm abutting relation. Beyond the nuts 24 is a shoulder 26 for an inner race ring 28 of a ball bearing 30 pressed on a reduced portion 32 of the spindle and locked by nuts 34.

An outer race ring 36 for the bearing 30 is pressed into a cylindrical recess in a housing 38 having a flange 40 with grease grooves surrounding the spindle to retain lubricant in the bearing. To put an initial load on the bearings as will appear, the housing 38 is mounted for axial sliding adjustment in a cylindrical bore 42 of a main casing or frame 44. Rotation of the housing 38 is prevented by a threaded sleeve 46 which enters a slot 48 of the housing, the sleeve also conducting lubricant from a grease fitting 50 to an opening 52 leading to the bearing. Axial adjustment of the housing 38 is effected by a nut 54 threaded thereon and locked to the main casing or frame by bolts 56. A fine adjustment is secured by cutting a series of slots 58 on the periphery of the nut 54 and by tapping openings 60 in the main casing or frame, the openings being spaced slightly nearer together than the slots. In the illustrated construction, six bolts 56 will register with six slots and openings and, upon a slight rotation of the nut, the bolts will register in another position with other slots and openings. A cap 62 having a flange 64 is secured to the end of the housing 38 by bolts 66 and a removable sheet metal cap 67 encloses all the bolts.

The bearing 14 has an outer race ring 70 pressed into a cylindrical recess in a housing 72 and covered by an annular cap 74 having a flange 76 with grease grooves closely surrounding the spindle. A split ring 78 holds the cap. The housing 72 is slidable axially in a cylindrical bore 80 in the main casing or frame and has a series of openings for coil springs 82 which abut against a washer 84 and tend to move the housing 72 in one direction. The washer 84 rests against a shoulder at the end of a cylindrical counterbore 86 in the main casing or frame. The washer has a flange 88 abutting against the outer race ring 90 of the ball bearing 6, the flange having an opening 92 directing lubricant to the bearing from a threaded sleeve 94 which also acts as a key. A cap 96 fastened by screws 98 to the main casing holds the race ring and washer firmly in place and a flange 100 and grease grooves on the cap make a close joint with the flange 3 to retain lubricant. Instead of driving the spindle by a pulley, a sprocket wheel with chain drive may be substituted in which case these members are lubricated through oilers 102 at the enlarged middle portion of the casing. The external diameters of the pulley or sprocket wheel and the housing 38 are made small enough to slip axially through the bores 86 and 80, thereby facilitating the assembly of these and other parts on the spindle before the spindle is put in the main casing.

The ball bearings, if subjected only to the radial load due to belt pull and pressure of the tool against the work might have some radial looseness at the side opposite the load, thus allowing vibration and chatter and necessitating the ball separators driving the unloaded balls. Accordingly an initial thrust load is placed on the balls causing them to shift laterally a little in the raceways to take an angle of contact as represented by the lines A, B and C. This puts load on all the balls and prevents the subsequent radial load from developing any looseness or play. The initial thrust load on bearings 30 and 6 is obtained by screwing up the nut 54 to move the bearing housing 38 outwardly towards the end of the spindle which lies to the right in Figure 1. This presses the outer race ring 36 and balls 30 to the right to make an angle of contact along the line A and puts the spindle in tension which in turn causes the inner race ring 4 and balls 6 to shift and make an angle of contact along the line B. If the spindle expands due to heat, the tendency is to lighten the thrust load on the bearings (and not to increase it), thereby giving the spindle a chance to cool and contract but, to avoid looseness and to maintain the initial thrust load or most of it, the adjustment of the load and the angle of contact is preferably made when the spindle is warm.

Chatter or whip of the spindle is prevented by the middle ball bearing 14 which is also given an initial thrust load because the springs 82 press the outer race ring 70 and balls 14 to the right to make an angle of contact along the line C. This insures all the balls being loaded and in contact with their raceways. The amount of initial thrust load on the bearing 14 can be regulated by the strength or number of the springs 82. The pressure of the springs 82 also increases the tension on the spindle and supplements the initial load on the bearings 6 which load is regulated by the adjusting nut 54. If the spindle expands, the springs will insure a thrust load on the bearing 6. All of the bearings and their housings, the spacing sleeves and the pulley are applied to the spindle when the latter is outside the main casing and the bores in the casing are such as to admit all the parts by axial movement. The antifriction bearings are preferably of a type wherein the ball grooves in the thicker inner race rings are about 25% deeper than the ball grooves in the thinner outer race rings since this makes both race rings have equal efficiency in safely taking a thrust load and gives minimum radial thickness to the bearings for a given load.

I claim:

1. In a bearing mounting, a main casing having bores, a spindle, bearing housings slidably fitting in the bores of the casing, an antifriction bearing in each housing for supporting the spindle, an antifriction bearing between the spindle and one end of the main casing, means for positively adjusting one of the bearing housings axially in its bore to put an initial thrust load upon its bearing and upon the end antifriction bearing, and a spring for pressing the other bearing housing axially in its bore to put a thrust load upon its bearing and to increase the thrust load on the end bearing; substantially as described.

2. In a bearing mounting, a main casing, a spindle, antifriction bearings for rotatably supporting the spindle near the ends of the casing, the casing having a cylindrical bore between and spaced from said bearings, a bearing housing slidable in said bore, an antifriction bearing in said housing for supporting the spindle, and means to slide the bearing housing axially in the bore to press the antifriction members against their raceways at all sides of the spindle; substantially as described.

3. In a bearing mounting, a main casing having bores at the ends, a spindle, an antifriction bearing in one of the bores for supporting the spindle, a bearing housing slidably supported in the other bore of the casing, an antifriction bearing in the housing for supporting the spindle, means for moving the bearing housing axially in its bore to put a thrust load on the bearings, and means between the spindle and the casing for preventing lateral movement of the middle portion of the spindle; substantially as described.

4. In a bearing mounting, a main casing having bores, a spindle, driving means attached to the spindle between the bores and having an external diameter smaller than the bores of the casing to pass axially therethrough, bearing housings slidable axially in the bores of the casing at opposite sides of the driving means, and antifriction bearings in the housings for supporting the spindle; substantially as described.

5. In a bearing mounting, a main casing having bores, a spindle, an antifriction bearing in one of the bores for supporting the spindle, a bearing housing slidably supported in the other bore of the casing, means for holding the housing from rotation in the bore, an antifriction bearing in the housing for supporting the spindle, means for axially adjusting the bearing housing in its bore to cause the bearings to assume an initially loaded angular contact position, the direction of loading adjustment of the housing being outwardly towards the end of the spindle whereby expansion of the spindle will lighten the load; substantially as described.

6. The combination with a spindle and its frame, of a race-member connected to said spindle, a housing adjustably movable with respect to said frame across the said race-member, said housing having a lubricant-retaining flange about said spindle and being also provided internally with a shoulder, means for holding said race-member against the above-mentioned movement, a cooperating race-member in said housing and against said shoulder whereby said race-member moves with said housing, balls between said race-members, and means for holding said housing in adjusted position; substantially as described.

7. The combination with a spindle and its frame, of a race-member of one bearing connected to said spindle to move longitudinally therewith, a race-member of a second bearing also so connected, a cooperating race-member and balls of the first said bearing, means preventing longitudinal movement of said cooperating race-member, a cooperating race-member and balls of said second bearing, a housing engaging said cooperating race-member of said second bearing to move said race-member with said housing, and positive means for moving said housing relatively to said cooperating race-member of the first said bearing and for holding it in the position to which it is so moved to maintain a positive internal load on the balls of both bearings; substantially as described.

8. The combination of a frame having an opening therein and an internal shoulder, a spindle in said opening and provided with a collar, a ball bearing for said spindle having its inner race-member engaged by said collar and its outer race-member held by said shoulder against longitudinal movement, a housing longitudinally movable in said opening and provided with an internal shoulder, a second ball bearing for said spindle having its outer race-member engaged by the shoulder of said housing to be moved thereby and its inner race-member held against separation from said spindle, and means for holding said housing in its adjusted position with the balls of both bearings under a positive internal load; substantially as described.

9. The combination with a spindle, its frame, and bearings between said spindle and frame and arranged with respect to each other in the direction of the length of the spindle, of means for holding the outer race-member of one of said bearings against lateral inward movement, means connecting the inner race-member of that bearing to said spindle for such inward movement with said spindle, means for preventing lateral separation between said spindle and the inner race-member of the second said bearing, and means for adjustably moving the outer race-member of said second bearing laterally outwardly and holding it in adjusted position whereby the elements of said bearings can be placed and positively held under tension and expansion of said spindle will tend to relieve that tension; substantially as described.

10. The combination with a frame having an internal shoulder, and a spindle within said frame, of a bearing having its outer race-member to the outer side of said shoulder, whereby said shoulder prevents inward lateral movement of said race-member, a collar upon said spindle at the outer side of the inner race-member of said bearing, a second bearing arranged at the inner side of said first mentioned bearing, means for preventing lateral outward movement on said spindle of the inner race-member of said second bearing, a laterally outwardly movable housing engaging the inner side of the outer race-member of said second bearing, and means for holding said housing in adjusted position with the rolling elements of both bearings under positive internal load; substantially as described.

11. In a bearing mounting, a casing, a spindle, anti-friction thrust-resisting bearings for rotatably supporting the spindle at separated points, an intermediate antifriction bearing between and spaced from said separated bearings, said intermediate bearing comprising rolling elements, an inner race ring and an outer race ring one of which is fixed against axial movement with respect to the spindle, and means for forcing the other race ring of said intermediate bearing in an axial direction to create an initial thrust load holding the rolling elements of the intermediate bearing constantly pressed against their raceways at all sides of the spindle; substantially as described.

12. In a bearing mounting, a spindle, a casing having a bore and an abutment face, a bearing housing slidable in the bore, a pair of antifriction bearings having their inner race rings secured to the spindle in spaced relation, cooperating outer race rings and rolling elements, means for preventing axial movement of one outer race ring with respect to the casing, the other outer race ring fitting in the bearing housing and movable therewith, and a nut threaded with the housing and engaging the abutment face to preload the rolling elements of both bearings along opposed angular contact lines; substantially as described.

13. In a bearing mounting, a spindle, a casing having a bore, a pair of spaced apart antifriction bearings having their inner races fixed against movement with respect to the spindle, co-operating outer race rings and rolling elements, a bearing housing for at least one of the bearings, driving means on the spindle, the assembled bearings, housing, spindle and driving means being of a diameter providing for endwise insertion in the casing bore, means for holding one outer race ring against axial movement with respect to the casing, the bearing housing slidably fitting in the bore and being initially free therein with the bearings under no internal load, and means for internally loading the bearings after their assembly with the spindle in the casing and comprising a device for positively sliding the bearing housing in its bore and for holding it in adjusted position; substantially as described.

14. In a bearing mounting, a spindle, a casing having a bore, a pair of spaced apart antifriction bearings having their inner race rings fixed against movement with respect to the spindle, cooperating outer race rings and rolling elements, a bearing housing for at least one of the bearings, the assembled bearings, housing and spindle being of a diameter providing for endwise insertion in the casing bore, means for holding one outer race ring against axial movement with respect to the casing, the bearing housing slidably fitting in the bore and being initially free therein with the bearings under no internal load, and means for applying a positive internal load to the bearings after their assembly in the casing and comprising a nut in threaded engagement with the bearing housing and engaging a stationary face carried by the casing; substantially as described.

THOMAS C. DELAVAL-CROW.